W. C. HURD.

Door.

No. 6,549. Reissued July 20, 1875.

Witnesses.
A. Ruppert.
S. M. Pool

W. C. Hurd
Inventor.
D. P. Holloway & Co
Attys

UNITED STATES PATENT OFFICE

WILLIAM C. HURD, OF WATERTOWN, CONNECTICUT.

IMPROVEMENT IN DOORS.

Specification forming part of Letters Patent No. 161,965, dated April 13, 1875; reissue No. 6,549, dated July 20, 1875; application filed June 21, 1875.

*To all whom it may concern:*

Be it known that I, WILLIAM C. HURD, of Watertown, in the county of Litchfield and State of Connecticut, have invented a certain Improvement in Safety-Doors, of which the following is a specification:

The object of my invention is to render wooden doors proof against penetration by ordinary wood-augers in the hands of burglars. To this end my improvement consists in introducing a thin sheet of chilled iron or other suitable metal into the body of wooden doors, covering about the entire area of the same.

Figure 1:
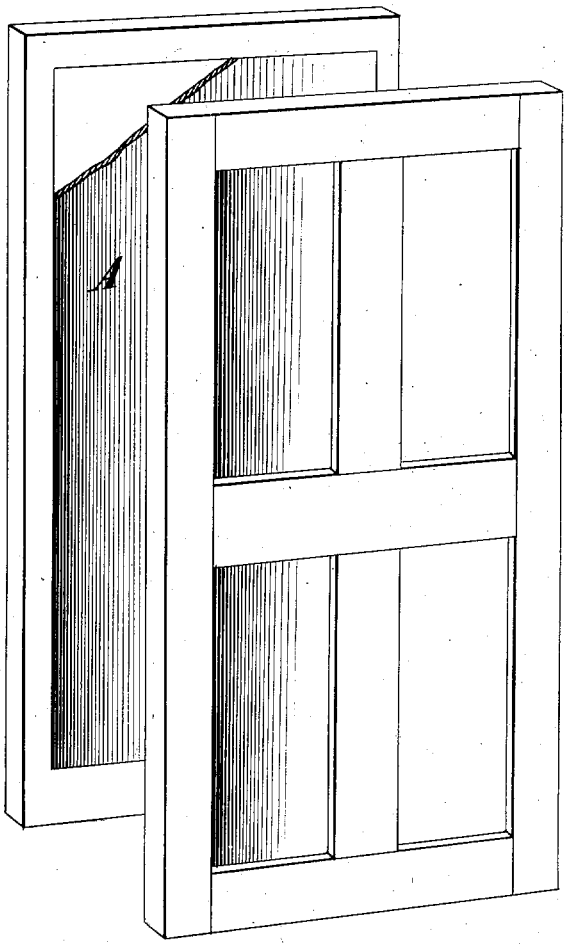
Figure 2:
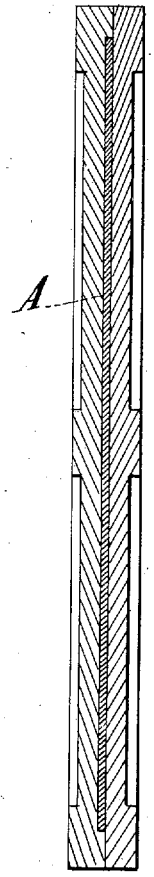

In the annexed drawings, Figure 1 is a perspective view of a door embodying my invention, it being shown as divided in the middle in order to expose the sheet of metal. Fig. 2 is a vertical section thereof.

The same letters of reference are used in both figures in the designation of identical parts.

In the application of my invention it is probably most convenient to divide the framework or sash of the door, and to insert the sheet A of metal between the halves, as illustrated in the drawings, the metallic sheet extending either to the edges, or to at least within near proximity to the edges.

I disclaim the metal plating of wooden doors upon the outside, that being very old. My construction differs from that in locating the metallic plate within the body of the door, so as not to interfere with the exterior ornamentation thereof. I prefer not to let the metallic plate extend quite to the edges, both for concealment and better securement of the plate, and to prevent its protrusion in case of shrinkage of the wood portion of the door.

What I claim as my invention, and desire to secure by Letters Patent, is—

A wooden door containing, between the exterior surfaces of the sashing, a sheet of chilled iron or other suitable metal, substantially as and for the purpose specified.

WILLIAM C. HURD.

Witnesses:
MYRON MCNEIL,
LEMAN W. CUTLER.